United States Patent [19]
Page

[11] 4,236,761
[45] Dec. 2, 1980

[54] DUAL CIRCUIT BRAKING SYSTEM EMPLOYING SINGLE LOAD SENSING VALVE IN ONE CIRCUIT AND RELAY VALVE IN OTHER CIRCUIT

[75] Inventor: Wilbur M. Page, Lincoln, England
[73] Assignee: Clayton Dewandre Company Limited, Lincoln, England
[21] Appl. No.: 963,318
[22] Filed: Nov. 24, 1978
[51] Int. Cl.³ .............................................. B60T 13/00
[52] U.S. Cl. .................................. 303/6 C; 303/22 R
[58] Field of Search ............ 188/195, 349; 303/22 A, 303/6 R, 6 A, 6 C, 7, 9, 22 R, 25, 40, 44, 63, 92, 118

[56] References Cited
U.S. PATENT DOCUMENTS

| | | | |
|---|---|---|---|
| 2,289,559 | 7/1942 | Turek | 303/63 |
| 3,275,381 | 9/1966 | Pfeifer | 303/7 |
| 3,674,317 | 7/1972 | Mangold | 303/118 |
| 3,804,468 | 4/1974 | Ishikawa et al. | 303/6 C |
| 3,832,015 | 8/1974 | Beck et al. | 303/40 |
| 3,944,294 | 3/1976 | Masuda et al. | 303/40 |
| 4,040,673 | 8/1977 | Ahaus et al. | 303/22 R X |

Primary Examiner—Douglas C. Butler
Attorney, Agent, or Firm—William W. Haefliger

[57] ABSTRACT

A fluid-pressure operated dual circuit braking system in which each circuit serves a rear axle brake and at least one front axle brake, one circuit only including a load sensing valve. The braking pressure in the other circuit is controlled by a relay valve in response to the modulated pressure from the load sensing valve. The relay valve includes a piston which is normally balanced but moves in the event of a failure in the circuit embodying the load sensing valve, to connect the unmodulated pressure in the relay valve circuit directly to the rear axle brakes.

5 Claims, 1 Drawing Figure

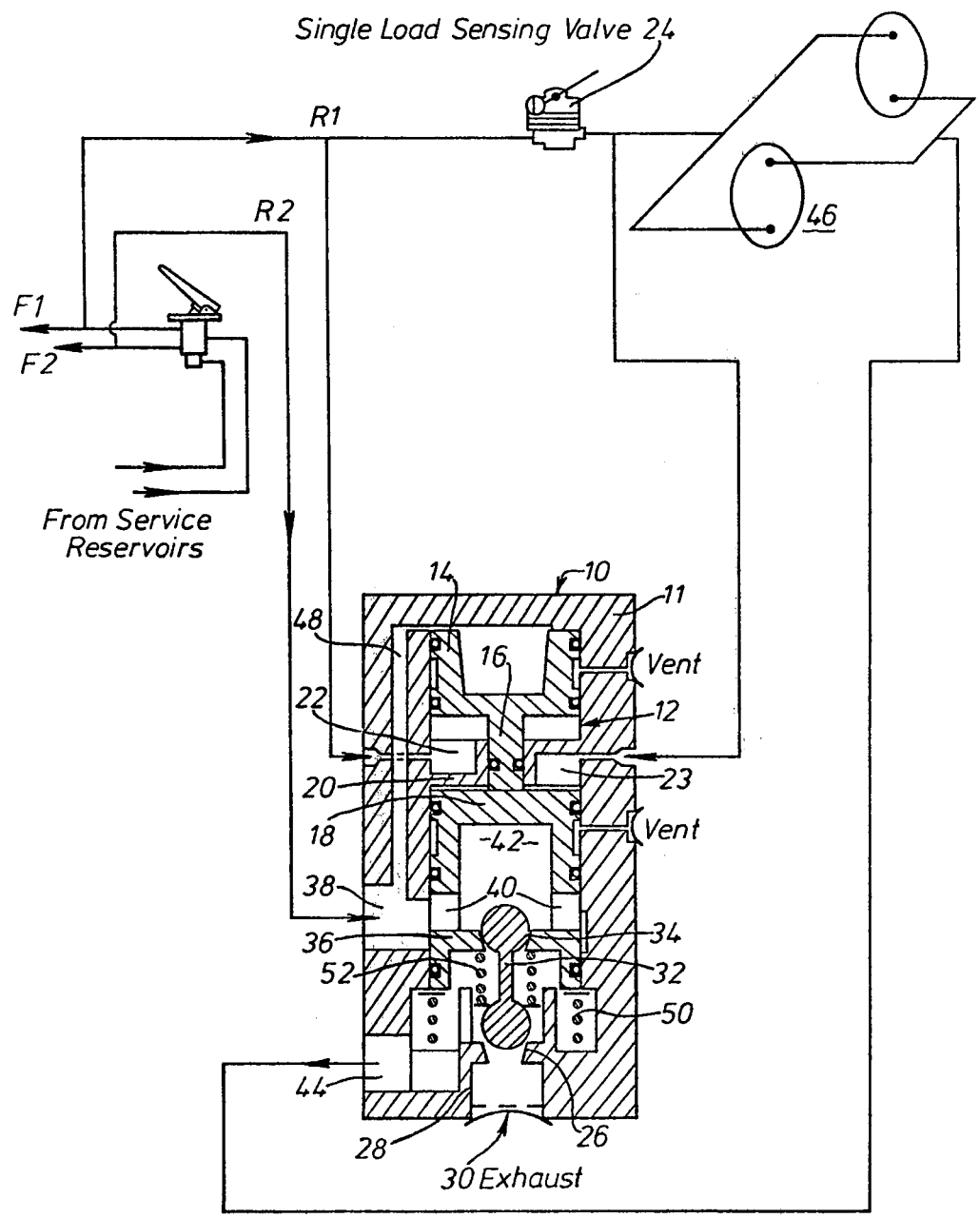

DUAL CIRCUIT BRAKING SYSTEM EMPLOYING SINGLE LOAD SENSING VALVE IN ONE CIRCUIT AND RELAY VALVE IN OTHER CIRCUIT

BACKGROUND OF THE INVENTION

This invention relates to fluid pressure-operated braking systems for motor vehicles and particularly to dual circuit systems where each circuit serves a rear axle brake and at least one front axle brake.

The application of load sensing modulating means to such systems has heretofore involved the insertion of a load sensing valve in each rear brake circuit. The possibility of using a load sensing valve in one circuit only and relaying the modulated pressure to the other circuit has received consideration, but use of a simple relay valve for this purpose would not meet safety regulations as in such circumstances a failure in the circuit embodying the load sensing valve could result in both circuits being rendered inoperative.

SUMMARY OF THE INVENTION

It is a major object of the present invention to overcome this drawback by using a load sensing valve in one circuit only and the modulated pressure therefrom to control the other circuit while at the same time ensuring that a degree of braking is retained in the event of a failure of either circuit.

According to the invention a dual circuit braking system as above defined is proposed and comprising a load sensing valve incorporated in one circuit and the modulated pressure is fed to a relay valve controlling the applied braking pressure in the other circuit, said relay valve incorporating a piston which is responsive on opposite sides to the respective unmodulated pressure in the two circuits and which piston is normally in balance, the arrangement being such that in the event of a failure in the circuit embodying the load sensing valve, the piston moves to a position in which it causes the unmodulated pressure in the second circuit to be conducted directly to brakes on the rear axle.

BRIEF DESCRIPTION OF THE DRAWING

A preferred embodiment of the invention will now be described by way of example with reference to the accompanying drawing which shows a pneumatic braking system.

DETAILED DESCRIPTION

The relay valve 10 comprises a housing 11 having a vertical cylindrical bore 12 in the upper part of which is disposed a balancing piston 14 having a depending stem 16 in abutment at its lower end with the upper end of a hollow co-axial operating piston 18. The stem 16 of the balancing piston 14 extends with a sealed sliding fit through a transverse housing wall 20, the space 22 above said wall 20 and beneath the balancing piston 14 being connected to the circuit embodying the load sensing valve 24 upstream of said valve 10, whilst the space 23 below said wall 20 and above the operating piston 18 is connected to said circuit downstream of the load sensing valve 24. At its lower end the housing 11 is formed to define an annular exhaust seating 26 around a passage 28 which opens to atmosphere past a check valve 30, a dumbbell valve 32 co-operating at one end with this seating and at the other end with a seating 34 around an opening formed in a transverse wall 36 in the operating piston 18. An inlet port 38 connected to the other of said circuits opens via radial ports 40 in the operating piston 18 to the interior 42 of said piston above the transverse wall 36 therein, whilst the space below said transverse piston wall 36 communicates with an outlet port 44 which in use is connected to brake actuators 46 on both wheels of the rear axle. A passage 48 formed in the housing 11 connects said inlet port 38 to the space above the balancing piston 14, a spring 50 beneath the operating piston 18 urging this piston upwards into contact with the stem 16 of the balancing piston. There is also a light spring 52 urging the dumbbell valve 32 downwards to hold the upper end thereof in engagement with its seating 34 on the transverse piston wall 36, in which position the lower end of the dumbbell valve 32 is spaced from its seating 26 on the housing. The valve operates as follows:

With both rear axle circuits R1 and R2 operative and when the two circuits are pressurized by the actuation of a dual brake valve in known manner, unmodulated pressure from the two circuits is conducted respectively to the spaces above 22 and below 23 the balancing piston 14 and thus cancelled out. Modulated pressure from the downstream side of the load sensing valve 24 is simultaneously conducted to the space above the operating piston 18 which is thus moved downwards, whereby the lower end of the dumbbell valve 32 closes on to the exhaust seating 26 and the upper end of said valve then moves off its seating 34 to establish communication between the said inlet port 38 and the brake-connected outlet port 44, thus relaying air from circuit R2 to the second circuit actuators at the rear axle in an equal ratio i.e. at the modulated value. Delivered pressure reacts on the control piston together with the spring force, to balance the force due to the input pressure thus holding the valve in the "lap" position. In the event of a failure in the circuit embodying the load sensing valve 24, and upon actuation of the dual brake valve, the unmodulated pressure of the relay controlled circuit will depress the balancing piston 14, and thereby the operating piston 18, so closing off the exhaust passage and connecting the outlet port 44 to the inlet port 38, whereby the unmodulated pressure of said circuit is communicated directly to the brake actuators 46 at both wheels on the rear axle. This feeding of unmodulated pressure to the rear brakes is permissible since these brakes are only subjected to half the braking force during an attempted full brake application on failure of one circuit.

If of course the relay-controlled circuit fails, the other circuit will continue to actuate its associated brakes under control of the load sensing valve 24.

I claim:

1. A fluid-pressure operated dual circuit braking system in which each circuit serves a rear axle brake and at least one front axle brake and comprising a load sensing valve incorporated in one circuit and a relay valve to which a modulated pressure is applied for controlling applied braking pressure in the other circuit, the relay valve having a piston which is responsive on opposite sides to the respective unmodulated pressure in the two circuits and which piston is normally in balance, the arrangement being such that in the event of a failure in the circuit incorporating the load sensing valve, the piston moves to a position in which it causes the unmodulated pressure in the said other circuit to be conducted directly to brakes on the rear axle, the first mentioned piston being a balancing piston and the relay valve also having an operating piston which is movable in response to the modulated pressure to actuate a valve member controlling the admission of pressure fluid to the brakes on the rear axle, and to which the said movement of the balancing piston is transmitted upon failure of the said one circuit, the pressure fluid control valve member which has the shape of a dumbbell being carried by the operating piston, and biased into contact, at one end, with a control valve seat on the operating piston, the control valve being actuated to admit pressure fluid to the brakes upon movement of the operating piston to bring the other end of the dumbbell valve member into engagement with an exhaust seating thereby closing off an exhaust connection with the brakes.

2. A braking system according to claim 1 wherein the control valve seat is in a transverse wall defining a chamber within the operating piston in communication with the inlet or unmodulated pressure fluid in the said other circuit, and wherein the operating piston and valve element are biased away from the exhaust seat in the body, whereby the operating piston moves first to allow the valve to close on the exhaust seat and secondly to open the inlet valve seat in the transverse wall and then to establish a valve lap position when both the input and delivery pressure balance.

3. A braking system according to either of claims 1 or 2 wherein the balancing piston and the operating piston are housed in separate coaxially arranged chambers, there being a rod or stem movable with the balancing piston and extending into the operating piston chamber for transmitting the said movement to the operating piston.

4. A fluid-pressure operated dual circuit braking system in which each circuit serves a rear axle brake and at least one front axle brake, and comprising
  (a) a load sensing valve incorporated at one circuit,
  (b) and a relay valve to which a modulated pressure is applied for controlling applied braking pressure in the other circuit, the relay valve having a balancing piston which is responsive to opposite sides to the respective unmodulated pressures in the two circuits and which piston is normally in balance,
  (c) the arrangement being such that in the event of a failure in the circuit incorporating the load sensing valve, the balancing piston moves to a position in which it causes the unmodulated pressure in the said other circuit to be conducted directly to brakes on the rear axle,
  (d) the relay valve also having an operating piston which is movable in response to the modulated pressure to actuate a valve member controlling the admission of pressure fluid to the brakes on the rear axle, and to which the said movement of the balancing piston is transmitted upon failure of the said one circuit,
  (e) said valve member carried by a first seating on the operating piston so as to move with the operating piston while closed against the seating to block said unmodulated pressure communication via a port to said brakes on the rear axle, said valve member moving off said first seating in response to said movement of the operating piston so as to engage exhaust seating thereby to unblock said unmodulated pressure communication to said rear axle brakes and to block communication of said port with the exhaust.

5. The system of claim 4 wherein the relay valve has a housing, said housing defining said port, and said housing also having second and third ports respectively to communicate said first and second circuit unmodulated pressures to said opposite sides of the balancing piston and also to communicate said second circuit unmodulated pressure to said operating piston, the housing having an additional port to communicate said modulated pressure to said operating piston.

* * * * *